United States Patent [19]

von der Ohe et al.

[11] Patent Number: 4,744,549

[45] Date of Patent: May 17, 1988

[54] COIL SPRING FOR THE WHEEL SUSPENSION OF A MOTOR VEHICLE WHEEL SUSPENSION SYSTEM

[75] Inventors: Manfred von der Ohe; Achim Hespelt, both of Stuttgart; Arthur Borlinghaus, Gummersbach, all of Fed. Rep. of Germany

[73] Assignee: Daimler-Benz Aktiengesellschaft, Stuttgart, Fed. Rep. of Germany

[21] Appl. No.: 890,550

[22] Filed: Jul. 30, 1986

[30] Foreign Application Priority Data

Jul. 30, 1985 [DE] Fed. Rep. of Germany ....... 3527184

[51] Int. Cl.[4] .......................... B60G 11/14; F16F 1/06
[52] U.S. Cl. ..................... 267/287; 267/166; 267/188
[58] Field of Search ............... 267/166, 167, 180, 8 R, 267/20 R, 20 A, 20 C, 60, 61 R, 61 S, 286, 287, 288; 280/670, 701

[56] References Cited

U.S. PATENT DOCUMENTS

| 354,672 | 12/1886 | Barling | 267/180 |
| 1,303,816 | 5/1919 | Fuller | 267/61 R |
| 2,203,392 | 6/1940 | Pica | 267/20 R |
| 3,773,309 | 11/1973 | Carter | 267/61 S |
| 4,557,469 | 12/1985 | Jeglitzka et al. | 267/61 R X |
| 4,561,640 | 12/1985 | Enke et al. | 257/61 R |

FOREIGN PATENT DOCUMENTS 1216474 3/1986 U.S.S.R. ............... 267/167

Primary Examiner—George E. A. Halvosa
Assistant Examiner—Matthew C. Graham
Attorney, Agent, or Firm—Barnes & Thornburg

[57] ABSTRACT

A coil spring for a motor vehicle wheel suspension system having two spring segments spaced apart in the axial direction along the central spring axis and a reinforced connecting piece extending parallel to the central spring axis for connecting the two spring segments. The two spring segments and the connecting piece form a unitary structure.

23 Claims, 2 Drawing Sheets

COIL SPRING FOR THE WHEEL SUSPENSION OF A MOTOR VEHICLE WHEEL SUSPENSION SYSTEM

BACKGROUND AND SUMMARY OF THE INVENTION

This invention relates to a coil spring for the wheel suspension of a motor vehicle wheel suspension system having two spring segments spaced at a distance from one another in the direction of the spring axis and having a connecting piece bridging the space between their adjacently opposite spring turns.

Coil springs of the mentioned type are known. In U.S. Pat. No. 4,561,640 and corresponding German Pat. No. 3,307,543, a coil spring of this type is shown, where the connecting piece bridging the space is formed by a pulled-apart coil. In addition, it has also been suggested in U.S. Pat. No. 4,561,640 and corresponding German Pat. No. 3,405,174 to guide the connecting piece bridging the space in a straight line through between the spring segments. In this case the connecting piece extends practically in the shell plane of the spring segments. The connecting piece in the case of this known construction is developed as a bridge member so that the spring as a whole consists of two separate segments. Each segment ends in a part of the connecting piece, and these segments of the connecting pieces are connected to one another via a connecting member.

To the surprise of the experts, springs of this type have proven to have good bearing capabilities and satisfactory deformation behavior. In particular, what did not occur and had originally been assumed, was a tilting of the spring segments under stress or a bulging of the connecting piece. As long as the spring is stressed to an admissible extent, this tilting and/or buling does not occur.

An objective of the invention is to improve the spring, particularly with respect to its endurance limit behavior According to the invention, this objective is achieved by the fact that the connecting piece is developed to be reinforced with respect to the adjacent spring turns. By means of this reinforcement, long-term fractures in the area of the connecting piece are avoided. These long-term fractures were not expected since in practice no undesired deformations had occurred in the area of the connecting piece.

Within the scope of the invention, it has been proven to be particularly advantageous to continue the reinforcement of the connecting piece into the connecting spring turn. This arrangement results in a further increase of the endurance limit of the spring. In this one preferred embodiment of the invention, the reinforcement is advantageously continued over about ⅛ of the length of the turn into part of each of the spring turns that connect to the connecting piece.

For the purpose of a simple manufacturing of the spring, it is advantageous for the reinforcement to be formed by an enlargement of the cross-section. According to this preferred embodiment of the invention, circumferential shape of the spring wire is advantageously maintained.

According to this preferred embodiment of the invention, the springs are advantageously developed in one piece, and the connecting piece extends in the direction of the spring axis, approximately in parallel to the direction of the spring axis.

The solution according to a preferred embodiment of the invention of reinforcing the connecting piece as well as the respective adjacent springs turns, can be carried out in the case of spring segments having an equal coil diameter, according to one preferred embodiment of the invention, as well as in the case of those having an unequal coil diameter, according to another preferred embodiment of the invention. Also, according to other preferred embodiments of the invention, the spring segments can be developed to be coiled in the same direction or in the opposite direction.

With respect to the long-term endurance behavior, it is also advantageous for the connecting piece to be arranged radially offset to the inside with respect to the shell surface of the connecting spring turn of at least one of the spring segments. According to this preferred embodiment, the spring turn preferably extends spirally radially to the inside in the transition to the connecting piece.

Other objects, advantages and novel features of the present invention will become apparent from the following detailed description of the invention when considered in conjunction with the accompanying drawings.

DETAILED DESCRIPTION OF THE INVENTION

Figure 1:
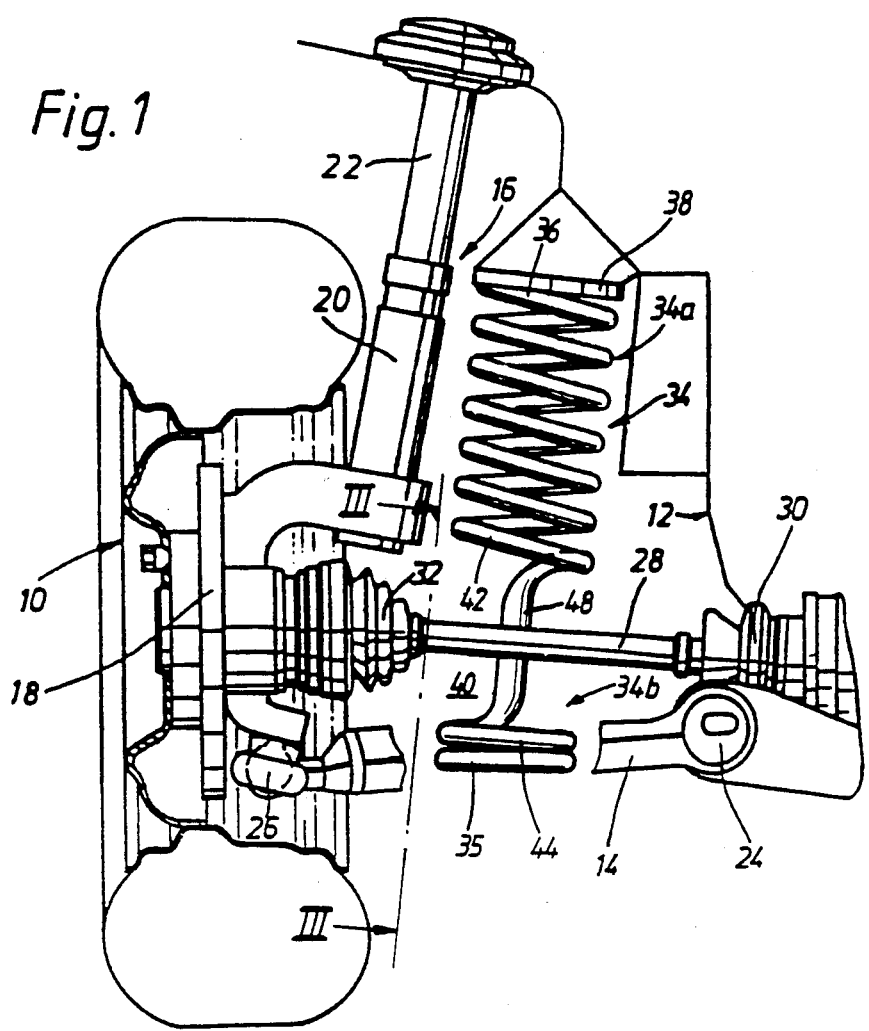
FIG. 1 is a rear view of a wheel suspension for a drivable motor vehicle rear wheel that is, for example, developed as an independent wheel suspension, into which a first embodiment of a coil spring according to the invention is installed.

The independent wheel suspension shown in FIG. 1 is used, for example, for the bearing and guiding of a drivable motor vehicle rear wheel 10 that is guided at the motor vehicle body 12 by means of a lower control arm 14 and a shock absorber strut 16 that is known.

For this purpose, a wheel carrier 18 carrying the rear wheel 10 is held so that it cannot be twisted at the lower end of an outer tube 20 of the shock absorber strut 16. The piston rod 22 of the shock absorber strut 16 is elastically supported at the vehicle body 12.

The control arm 14 is pivotable in a joint 24 provided at the motor vehicle body 12 on one side, preferably with the insertion of rubber, and is coupled to the wheel carrier 18 by means of a ball joint 26 on the other side.

The drive of the rear wheel 10 takes place via an axle shaft 28 arranged at a distance above the control arm 14 and extending transversely to the longitudinal axis of the vehicle. The axle shaft 28, in a known manner, has one joint, 30 and 32 respectively, on the side of the wheel and on the side of the transmission.

A coil spring 34, which is arranged in the wheel suspension in an upright position with respect to the longitudinal direction of the vehicle, is installed between the shock absorber strut 16 and the joint 24 of the control arm 14 on the body side in such a way that, in top view, the coil spring covers the axle shaft 28. With its lower spring end turn 35 forming an at least part-ring-shaped rest, the coil spring 34 supports itself at one end on the wheel guiding member formed by the control arm 14. At the other end, the coil spring 34 supports itself at the vehicle body with its upper spring end coil 36. A spring-plate-shaped supporting member 38 is provided at the vehicle body 12 to receive the upper spring end coil 36. At the control arm 14, the lower end of the coil spring 34 may be fastened in a cup-type indentation, which is not shown.

As shown in FIG. 1, the axle shaft 28 crosses the coil spring 34 that covers it from a top view perspective. The coil spring is therefore penetrated by the axle shaft 28. For this purpose, the coil spring 34 is equipped with a spring expansion 40 through which the axle shaft 28 is guided without contacting the coil spring 34.

The space formed in the coil spring 34 by means of the spring expansion 40 has such a height that even in the case of maximal compression and rebound of the spring, the axle shaft 28 remains out of contact with the turn parts of the two spring turns 42, 44 that delimit the spring expansion 40.

By means of the spring expansion 40, the coil spring 34 is divided into two coiled spring segments 34a and 34b that support themselves on one another via a rod-shaped connecting piece 48 that is preferably circular in its cross-section. According to FIG. 3, the coil spring 34 extends in the area of the spring expansion 40 in the direction of the spring axis 46 or essentially in parallel to it.

The connecting piece 48, in one piece, changes over in each case into an end piece 42' and 44' of the two turn parts of the two coil turns 42, 44 delimiting the spring expansion; i.e., the spring segments 34a, 34b and the rod-shaped connecting piece 48 are made from one single wire.

Figure 3:
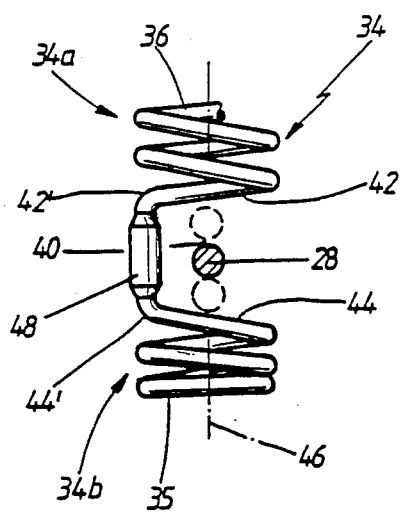
FIG. 3 is a lateral view of a part of the coil spring according to FIG. 1 along Line III of FIG. 1.

The connecting piece 48 is reinforced with respect to the wire of the adjacent spring turns 42, 44 of the spring segments 34a, 34b. As shown in FIG. 3, the connecting piece 48 extends to the end pieces 42', 44' of the spring turns 42, 44. The reinforcement of connecting piece 48 is carried out by a corresponding enlargement of its diameter.

As shown in FIG. 1, the two spring segments 34a, 34b, of which, in the shown embodiment, the lower segment 34b, for example, has only two spring turns 44, are coiled in the same direction, in which case both spring segments 34a, 34b are cylindrical and have the same diameters. However, according to other preferred embodiments of the invention, the segments may deviate from one another with respect to the diameter as well as with respect to the shape, by being developed, for example, in a conical shape or in the manner of a so-called miniblock spring, resulting advantageously in areas in a desired elastic softness and overall height of the coil spring.

Figure 2:
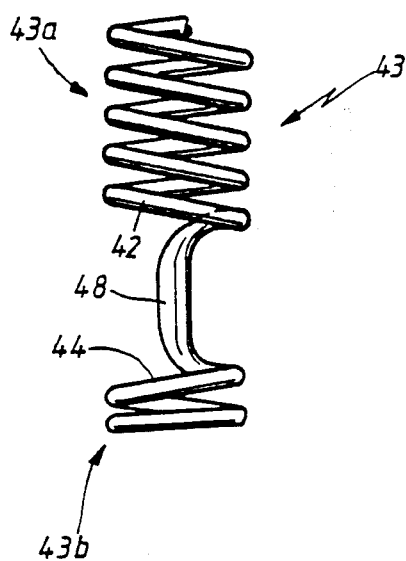
FIG. 2 is a representation of a second embodiment of the coil spring according to FIG. 1.

FIG. 2 shows a preferred embodiment of the invention in which the two spring segments 43a, 43b of the coil spring 43 are coiled in opposite directions.

The coiling of the two spring segments 34a, 34b in the same or the opposite direction ensures, in connection with the reinforced, rod-shaped connection piece 48 extending in the direction of the spring axis 46 and being shaped onto it in one piece, a course of tension in the case of spring strain that has a favorable effect on the life of the coil spring.

According to this preferred embodiment, the wire diameter may be kept constant over all spring turns, or may continuously decrease in diameter in the direction of the free end of the wire. These variants may apply to one or to both spring segments 34a and 34b.

Figure 4:
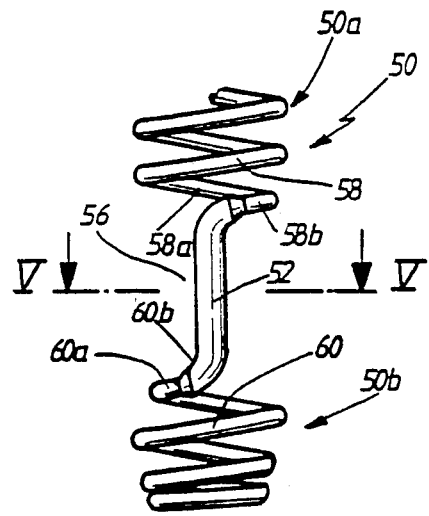
FIG. 4 is a view of a third embodiment of a coil spring in the relaxed state and in an installed state according to FIG. 1.
Figure 5:
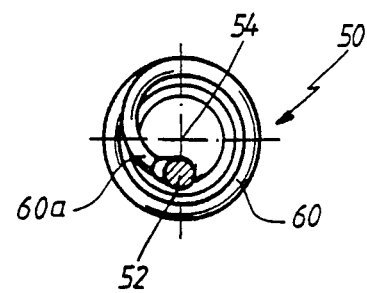
FIG. 5 is a section through the coil spring according to FIG. 4 along Line V—V of FIG. 4.

FIG. 4 shows a coil spring 50, the reinforced connecting piece 52 of which, as shown in FIG. 5, is provided between the spring axis 54 and the interior circumference of the two spring segments 50a and 50b that are preferably coaxial with respect to one another.

In the case of the shown embodiment, both turn parts 58a and 60a of the two coil turns 58 and 60 that delimit the spring expansion 56 and change over into the connecting piece 52, have a spiral-shaped course in the direction of the connecting piece 52 (FIG. 5). According to this preferred embodiment, the reinforced connecting piece 52 at the same time also extends over part of the mutually opposite turn parts 58a, 60a of the spring turns 58, 60, preferably by the amount of ⅓ of the turn length.

This course of the connecting piece 52 in its end areas causes an additional tension-related relief of the coil spring 50 at the transition points of the spring segments 50a and 50b to the connecting piece 52 in the stressed state.

The connecting piece 52 that was reinforced or correspondingly enlarged in its diameter has particularly a correspondingly large moment of resistance with respect to torsional tensions acting in it.

It was found in this case that a radial offset of the connecting piece 52 into the interior of the spring by the amount of half its diameter, as shown in FIG. 5, increases the long-term behavior of the coil spring 34 and 52 by the factor 10. In the case of a larger radial offset the long-term behavior of the coil spring 34 and 52 is more significantly increased. As clearly shown in FIG. 4, the spring segments 50a, 50b are arranged such that the coils 60 of the lower spring segment 50b have different coil diameters.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

We claim:

1. A coil spring for the wheel suspension of a motor vehicle wheel suspension system having two spring segments spaced at a distance from another in the direction of the spring axis and having a connecting piece developed in one piece as a continuous uninterrupted strand with the spring segments bridging the space between the adjacently opposite spring turns of the two spring segments, and wherein the connecting piece is developed to be reinforced by a change in its configuration enlarging its cross-section in at least one radial direction with respect to the adjacent spring turns.

2. A coil spring according to claim 1, wherein the reinforcement of the connecting piece is continued into the adjacent spring turn.

3. A coil spring according to claim 1, wherein the reinforcement extends in the part of the spring turn that connects to the connecting piece, over about ⅓ of the length of the turn.

4. A coil spring according to claim 1, wherein the connecting piece located between the spring segments extends in the direction of the spring axis.

5. A coil spring according to claim 1, wherein the spring segments have different turn diameters.

6. A coil spring according to claim 1, wherein the spring segments have the same turn diameters.

7. A coil spring according to claim 1, wherein the spring segments are coiled in the same direction.

8. A coil spring according to claim 1, wherein the spring segments are coiled in the opposite direction.

9. A coil spring according to claim 1, wherein the connecting piece is arranged to be radially offset to the inside with respect to an inner surface of the following spring turn of at least one of the spring segments.

10. A coil spring according to claim 9 wherein the spring turn of one spring segment extends spirally to the radial inside to the reinforced connecting piece.

11. A coil spring having a central spring axis for a motor vehicle wheel suspension system comprising:
    first and second spring segments each having at least two coils, said first and second spring segments being spaced apart in axial direction along the central spring axis of the coil spring; and
    reinforced connecting means developed in one piece as a continuous uninterrupted strand with the spring segment for connecting the first and second segments;
    wherein the connecting means has a larger cross-sectional diameter than the adjacent coils of the first and second spring segments arranged adjacent to the connecting means.

12. A coil spring according to claim 11, wherein the connecting means is arranged substantially parallel to the central spring axis of the coil spring.

13. A coil spring according to claim 12, wherein the connecting means is arranged offset from the central spring axis of the coil spring.

14. A coil spring according to claim 13, wherein the connecting means offset position is located closer to the central spring axis than an external diameter surface of any coil of the first and second spring segments.

15. A coil spring according to claim 14, wherein the connecting means is arranged offset from the central spring axis by the amount of half of the said external diameter surface.

16. A coil spring according to claim 11, wherein the larger cross-sectional diameter exhibited by the connecting means continues into the adjacent coils of the first and second spring segments.

17. A coil spring according to claim 16, wherein the larger cross-sectional diameter exhibited by the adjacent coils continues over approximately one-eighth ($\frac{1}{8}$) of a length of each adjacent coil.

18. A coil spring according to claim 11, wherein the spring segments have different coil diameters.

19. A coil spring according to claim 11, wherein the spring segments have the same coil diameters.

20. A coil spring according to claim 11, where in the spring segments are coiled in the same direction.

21. A coil spring according to claim 11, wherein the spring segments are coiled in the opposite direction.

22. A coil spring according to claim 11, wherein at least one of the adjacent coils is further offset from the central spring axis than the connecting means.

23. A coil spring according to claim 11, wherein at least one of the spring segments has a reduced diameter coil as it extends spirally away from the connecting means.

* * * * *